US012301735B2

United States Patent
Rule et al.

(10) Patent No.: US 12,301,735 B2
(45) Date of Patent: May 13, 2025

(54) SYSTEMS AND METHODS FOR CONTACTLESS CARD COMMUNICATION AND MULTI-DEVICE KEY PAIR CRYPTOGRAPHIC AUTHENTICATION

(71) Applicant: Capital One Services, LLC, McLean, VA (US)

(72) Inventors: Jeffrey Rule, Chevy Chase, MD (US); Kevin Osborn, Newton Highlands, MA (US); Wayne Lutz, Fort Washington, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/352,181

(22) Filed: Jun. 18, 2021

(65) Prior Publication Data
US 2022/0407723 A1    Dec. 22, 2022

(51) Int. Cl.
*H04L 9/32* (2006.01)
*H04L 9/08* (2006.01)
*H04L 9/14* (2006.01)

(52) U.S. Cl.
CPC .......... *H04L 9/3271* (2013.01); *H04L 9/0825* (2013.01); *H04L 9/14* (2013.01); *H04L 9/3231* (2013.01); *H04L 9/3247* (2013.01)

(58) Field of Classification Search
CPC ....... H04L 9/3271; H04L 9/0825; H04L 9/14; H04L 9/3231; H04L 9/3247
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

"KeyLED-transmitting sensitive data over out-of-band channels in wireless sensor networks" R Roman, J Lopez (Year: 2008).*

(Continued)

*Primary Examiner* — Farid Homayounmehr
*Assistant Examiner* — Brian William Avery
(74) *Attorney, Agent, or Firm* — KDW Firm PLLC; Andrew D. Kasnevich

(57) ABSTRACT

Systems and methods for authentication may include an authenticator. The authenticator may include a processor and a memory. The processor may be configured to: receive one or more challenges; generate a first instruction, the first instruction including a request to retrieve a first Fast Identity Online (FIDO) key; transmit the first instruction; receive the first FIDO key; sign the one or more challenges using the first FIDO key; and transmit one or more signed challenges for validation using a second FIDO key.

18 Claims, 7 Drawing Sheets

(56) References Cited

U.S. PATENT DOCUMENTS

| | | |
|---|---|---|
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,433,914 B1 | 4/2013 | Philpott et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |

(56) References Cited

U.S. PATENT DOCUMENTS

| | | |
|---|---|---|
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,602,508 B1 | 3/2017 | Mahaffey et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,685,350 B2 | 6/2020 | Osborn et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |

(56) References Cited

U.S. PATENT DOCUMENTS

| | | |
|---|---|---|
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0262830 A1 | 10/2010 | Kusakawa et al. |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0189350 A1 | 7/2014 | Baghdasaryan et al. |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0121068 A1 | 4/2015 | Lindemann et al. |
| 2015/0134452 A1 | 5/2015 | Williams |
| 2015/0140960 A1 | 5/2015 | Powell et al. |

(56) References Cited

U.S. PATENT DOCUMENTS

| | | |
|---|---|---|
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0180869 A1 | 6/2015 | Verma |
| 2015/0186871 A1 | 7/2015 | Laracey |
| 2015/0205379 A1 | 7/2015 | Mag et al. |
| 2015/0262180 A1 | 9/2015 | Hambleton et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0348026 A1 | 12/2015 | Roberts et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0212113 A1* | 7/2016 | Banerjee ............... H04W 12/06 |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0026787 A1 | 1/2018 | Le Saint et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0101847 A1 | 4/2018 | Pisut |
| 2018/0129945 A1 | 5/2018 | Saxena et al. |
| 2018/0160255 A1 | 6/2018 | Park |
| 2018/0167384 A1 | 6/2018 | Raepple et al. |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0337914 A1 | 11/2018 | Mohamad Abdul et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0124081 A1 | 4/2019 | Nowak et al. |
| 2019/0238517 A1 | 8/2019 | D'Agostino et al. |
| 2020/0104841 A1* | 4/2020 | Osborn ................ H04L 9/0631 |
| 2020/0127858 A1 | 4/2020 | Stöhr et al. |
| 2020/0196143 A1 | 6/2020 | Woo et al. |
| 2020/0336308 A1 | 10/2020 | Deutschmann et al. |
| 2020/0396299 A1 | 12/2020 | Mitsov et al. |
| 2021/0211279 A1 | 7/2021 | Nix |
| 2021/0352069 A1* | 11/2021 | Momchilov ............ G06F 21/32 |
| 2022/0166623 A1* | 5/2022 | Alfonso Reyes ..... H04L 9/3073 |
| 2023/0179589 A1* | 6/2023 | Kopack ............... H04L 63/0492 |
| | | 726/4 |

FOREIGN PATENT DOCUMENTS

| | | |
|---|---|---|
| CN | 102170354 | 8/2011 |
| CN | 102467789 | 5/2012 |
| CN | 103023643 | 4/2013 |
| CN | 103417202 | 12/2013 |
| CN | 104283886 | 1/2015 |
| CN | 104835038 | 8/2015 |
| CN | 106416189 | 2/2017 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 3 663 946 | 6/2020 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | 2013/109932 | 7/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2020/092351 | 5/2020 |

OTHER PUBLICATIONS

Smart Card Alliance: "Smart Card Technology and the FIDO Protocols", White paper, Apr. 1, 2016, pp. 1-19, XP055540200, Retrieved from the Internet: URL:https://www.securetechalliance.

(56) References Cited

OTHER PUBLICATIONS org/wp-content/uploads/FIDO-and-Smart-Card-Technology-FINAL-April-2016.
Wesley Dunnington, FIDO: Everything You Need to Know About Fast Identity Online, PingIdentity, May 13, 2021, 14 pages.
Dominik Hoefling, Understanding How FIDO Makes Passwordless Authentication Possible, May 6, 2021, 9 pages.
Identity Management Institute, Why Switch to Fast Identity Online (FIDO) Authentication, 2020, 6 pages.
Batina, Lejla and Poll, Erik, "SmartCards and RFID," PowerPoint Presentation for IPA Security Course, Digital Security at University of Nijmegen, Netherlands (date unknown), 75 pages.
Haykin M. and Warnar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "VisaR Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_201206070619 23900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-pay ments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/US/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.

(56) References Cited

OTHER PUBLICATIONS

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™M", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Brand et al., (2018). "Client to Authentication Protocol (CTAP)", fidoAlliance, [online] Jul. 2, 2018, [retrieved on May 14, 2019]. Retrieved from Internet URL: https://fidoalliance.org/specs/fido-v2.0-rd-20180702/fido-client-to-authenticator-protocol-v2.0-rd-20180702.html, 97 pages.

Lindemann et al., FIDO UAF Protocol Specification Alliance Proposed Standard Feb. 2, 2017, 43 pages) (Year: 2017).

Chang et al, "On Making U2F Protocol Leakage-Resilient via Re-Keying", Cryptology ePrint Archive, Report 2017/721, Aug. 2017, 31 pages (Year: 2017).

HIDglobal (Crescendo C2300 Smart Card Datasheet, Posted Date: Jul. 1, 2019, 2 pages) (Year: 2019).

FIDO2 Deep Dive—Attestations, Trust Model and Security—Kudelski Security Research, Feb. 12, 2020, 22 pages, Retrieved from Internet URL: https://research.kudelskisecurity.com/2020/02/12/fido2-deep-dive-attestations-trust-model-and-security/.

Fido Alliance: "Client to Authenticator Protocol (CTAP)", Jan. 30, 2019, Retrieved from the Internet: URL:https://fodpa;;oamce/prg/specs/fido-v2.0-ps-20190130/fido-client-to-autenticator-protocol-v2.0-ps-20190130.html [retrieved on Sep. 8, 2022].

Dirk Balfanz "FIDO TechNotes:Channel Binding and FIDO" (Year: 2016).

International Search Report and the Written Opinion of the International Searching Authority issued in related PCT Application No. PCT/US2022/033724 mailed Oct. 7, 2022.

* cited by examiner

SYSTEMS AND METHODS FOR CONTACTLESS CARD COMMUNICATION AND MULTI-DEVICE KEY PAIR CRYPTOGRAPHIC AUTHENTICATION

FIELD OF THE DISCLOSURE

The present disclosure relates to systems and methods for contactless card communication and, more specifically, for key pair cryptographic authentication of contactless cards using multiple devices.

BACKGROUND

Card-based operations often involve the use of a card in communication with a server or other device. It is necessary to protect such communications from interception and unauthorized access. However, there are numerous sophisticated methods for data interception that may be employed by hackers or other fraudulent actors.

For example, transmission of data without encryption or other protection is susceptible to man-in-the-middle attacks, phishing attacks, replay attacks, and other attacks, and may be subject to other vulnerabilities, resulting in increased security risks and increased risks of account or card misuse. These risks may be further increased through the use of contactless cards, which communicate with other devices wirelessly, thus exposing data to potential interception during transmission.

Measures taken to address security risk, such as encryption, may consume system resources and hinder operational efficiency. For large numbers of operations, the consumption of system resources and the hindrance of operation efficiency can increase, which may result in a failure to perform operations or unsatisfactory performance. In addition, there may be situations in which access to secure authenticator devices is limited or unavailable, thereby adversely impacting secure encryption, data transmission, and access to secure registration and authentication, which may lead to a compromised account that can be used to initiate fraudulent transactions or an account takeover.

These and other deficiencies exist. Accordingly, there is a need for systems and methods for authentication that overcome these deficiencies by protecting communications from interception and unauthorized access in a secure and reliable manner while effectively utilizing multi-device key pair cryptographic authentication and securely and quickly identifying the originator and determining their authenticity.

SUMMARY OF THE DISCLOSURE

Embodiments of the present disclosure provide an authenticator. The authenticator may include a processor and a memory. The processor may be configured to receive one or more challenges. The processor may be configured to generate a first instruction, the first instruction including a request to retrieve a first Fast Identity Online (FIDO) key. The processor may be configured to transmit the first instruction. The processor may be configured to receive the first FIDO key. The processor may be configured to sign the one or more challenges using the first FIDO key. The processor may be configured to transmit one or more signed challenges for validation using a second FIDO key.

Embodiments of the present disclosure provide a method of authentication. The method may include receiving, at a processor, one or more challenges. The method may include generating, by the processor, a first instruction including a request to retrieve a first Fast Identity Online (FIDO) key. The method may include transmitting, by the processor, the first instruction. The method may include receiving the first FIDO key. The method may include signing, by the processor, the one or more challenges using the first FIDO key. The method may include transmitting, by the processor, one or more signed challenges for validation using a second FIDO key.

Embodiments of the present disclosure provide a computer readable non-transitory medium comprising computer executable instructions that, when executed on a processor, perform procedures comprising the steps of: receiving one or more challenges; generating a first instruction including a request to retrieve a first Fast Identity Online (FIDO) key; transmitting the first instruction; receiving the first FIDO key; signing the one or more challenges using the first FIDO key; and transmitting one or more signed challenges for validation using a second FIDO key.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
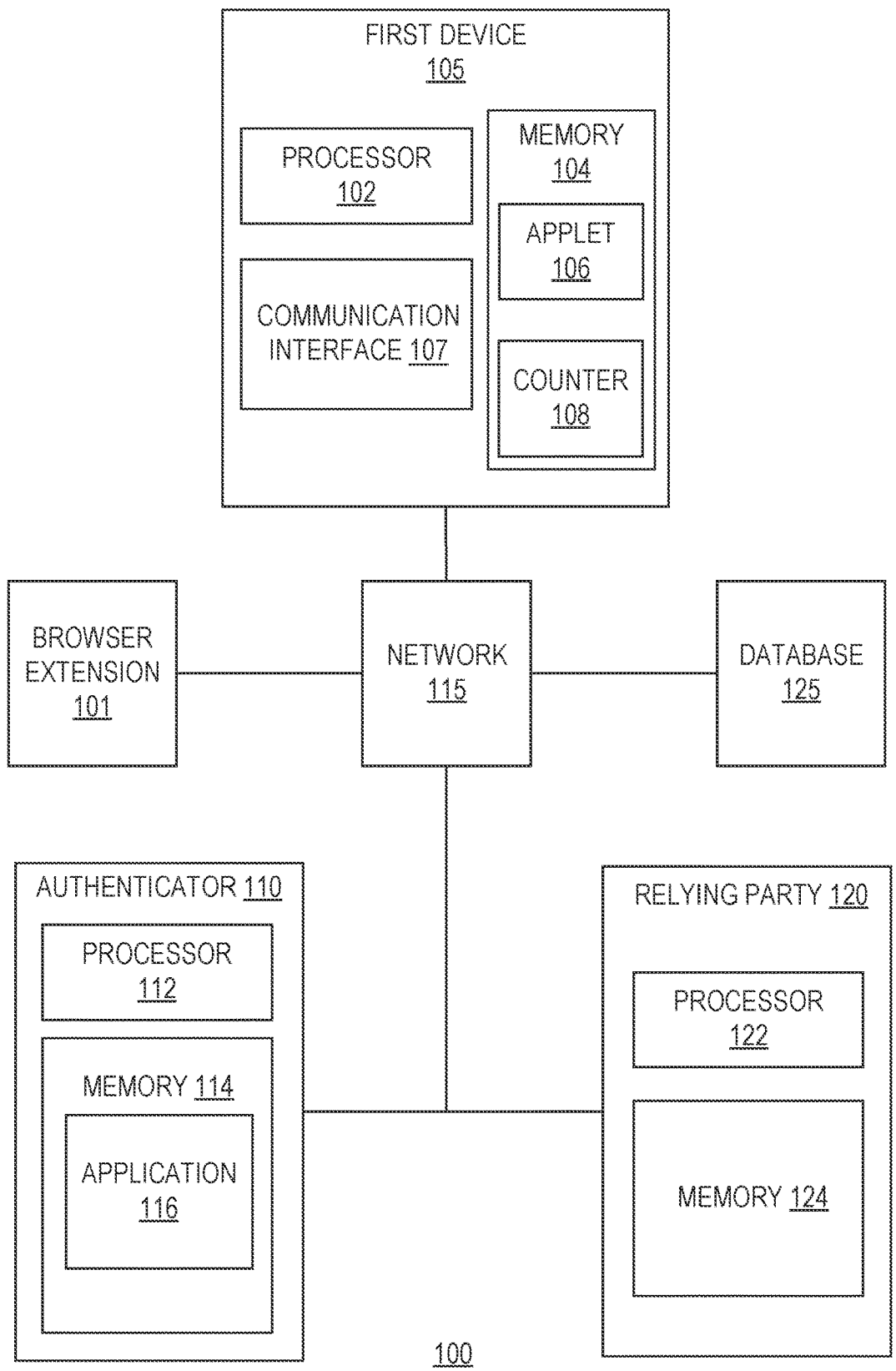
FIG. 1 depicts an authentication system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein may be used to supplement authentication frameworks, including without limitation, Fast Identity Online (FIDO) authentication, Fast Identity Online 2 (FIDO2) authentication, WebAuthn, Client to Authenticator Protocol (CTAP) FIDO, other authentication implementations. Systems and methods employed herein may be implemented with distributed storage, cloud-based storage, and other forms of storage in support of this functionality. The systems and methods disclosed herein allow a device to serve as a roaming authenticator in a Fast Identity Online 2 (FIDO2) authentication in a browser. As further explained below, a user may authenticate with a website in a passwordless environment using the implemented systems and methods. To log into the website, a private key may be stored on the device during the website registration process. When the user desires to log into the website again, the device may enter a communication field, such as that of a mobile device, via one or more gestures including but not limited to a tap, a swipe, a wave, or the like. The private key may then be transmitted from the first device to an application comprising instructions for execution on the mobile device, including but not limited to an authenticator. The authenticator may be configured to sign the challenge issued by the website using the private key. Once the challenge has been signed, it may be transmitted to a relying party server and validated using the public key stored. In this manner, this authentication may serve as primary authentication to log in the user. Furthermore, this authentication may be used in conjunction with a secondary factor authentication, such as biometrics or credential, entered on the mobile device.

Benefits of the systems and methods disclosed herein include improved authentication by protecting communications from interception and unauthorized access and securely and quickly identifying the originator and determining their authenticity. The systems and methods disclosed herein allow for the avoidance of man-in-the-middle attacks and phishing attacks, prevention of replay attacks, improved accessibility and security of authenticator devices and secure encryption and data transmission, and the reduction of other security vulnerabilities by using, without limitation iOS® and Android® executing on devices, as an authenticator in a FIDO2 authentication in a browser, such as a laptop browser or tablet browser or desktop browser while implementing conditional multi-factor authentication.

Further, a concern with the FIDO2 framework and other authentication frameworks is establishing the identity of the user seeking to undertake the authentication process. Systems and methods described herein may reduce this vulnerability by confirming the user attempting to register credentials and authenticate via the framework is the user he or she claims to be and is authorized to perform the authentication process. By doing so, framework security and the ability to exclude unauthorized users may be increased. Accordingly, security risks may be further mitigated and compatibility across various devices and transaction efficiency may be further improved. In some examples, computation processing of the authenticator is reduced when instructing the first device to retrieve or generate one or more FIDO keys instead of generating the one or more FIDO keys in the authenticator.

These features can be implemented without degrading the user experience by burdening the user with unnecessary security tasks. Further, these features may be performed in a manner that allows for the time-efficient performance of transactions, in order to comply with user expectations and transaction requirements.

Accordingly, the systems and methods disclosed herein reduce the risk of fraudulent activity, such as misuse of the card or an account associated with the card, while also improving secure access to authenticator devices and encrypted data transmissions. Systems and methods disclosed herein improve upon implementations that lack secure authentication. These benefits may be advantageously achieved while promoting system efficiency, avoiding degradation of the user experience, and promoting compatibility across numerous devices.

FIG. 1 illustrates an authentication system 100. The system 100 may comprise a browser extension 101, first device 105, an authenticator 110 or a second device, a network 115, a relying party or server 120, and a database 125. Although FIG. 1 illustrates single instances of components of system 100, system 100 may include any number of components.

System 100 may include a browser extension 101. The browser extension 101 may comprise Chrome®, Internet Explorer®, Firefox®, or Safari®. It is understood that software applications other than a browser extension may be utilized, including stand-alone software applications. Without limitation, an authentication request, such as a website registration may take place on any device, including but not limited to a laptop or a desktop associated with the browser extension 101. A mobile-based browser extension 101, or a tablet-based browser extension 101, or a laptop-based browser extension 101, or a desktop-based browser extension 101, may be configured to transmit and receive one or more requests, as further explained below.

System 100 may include a first device 105. Without limitation, the first device 105 may comprise a contactless card, a contact-based card, a network-enabled computer, or other device described herein. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and at least one key.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the authenticator 110 or second device, relying party or server 120, and/or database 125 via network 115.

First device 105 may be in data communication with any number of components of system 100. For example, first device 105 may transmit data via network 115 to the authenticator 110 or second device, and/or relying party or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include an authenticator 110. The authenticator 110 may comprise a roaming authenticator to another client device. In some examples, the authenticator 110 may include a mobile device that serves as a roaming authenticator to a laptop, a desktop, or a tablet. It is understood that the client devices are not limited to such devices, and that other client devices are within the scope of the invention.

By way of example, the authenticator 110 may comprise a second device. The authenticator 110 may include one or more processors 112, and memory 114. Memory 114 may include one or more applications, including but not limited to application 116. The authenticator 110 may be in data communication with any number of components of system 100. For example, the authenticator 110 may transmit data via network 115 to server 120. The authenticator 110 may transmit data via network 115 to database 125. Without limitation, the authenticator 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. The authenticator 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The authenticator 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The authenticator 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to the relying party or server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include a server 120. For example, and without limitation, the server 120 may comprise a relying party. In some examples, the server 120 may include one or more processors 122 coupled to memory 124. Without limitation, the server 120 may comprise a cloud-based authenticator. The server 120 may be configured as a central system, server or platform to control and call various data at different times to execute a plurality of workflow actions. The server 120 may be configured to connect to the first device 105. The server 120 may be in data communication with the applet 106 and/or application 116. For example, a server 120 may be in data communication with applet 106 via one or more networks 115. The first device 105 may be in communication with one or more servers 120 via one or more networks 115, and may operate as a respective front-end to back-end pair with server 120. The first device 105 may transmit, for example from applet 106 executing thereon, one or more requests to the server 120. The one or more requests may be associated with retrieving data from the server 120. The server 120 may receive the one or more requests from the first device 105. Based on the one or more requests from applet 106, the server 120 may be configured to retrieve the requested data. The server 120 may be configured to transmit the received data to applet 106, the received data being responsive to one or more requests.

In some examples, the server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single relying party or server 120, it is understood that other embodiments can use multiple servers or multiple computer systems as necessary or desired to support the users and can also use back-up or redundant servers to prevent network downtime in the event of a failure of a particular server.

The server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, the server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, authenticator 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

The processor 122 of server 120 may be configured to receive an authentication request. For example, the authentication request may be received from browser extension 101. In some examples, the authentication request may comprise a request for Fast Identity Online 2 (FIDO2) website registration. The processor 122 may be configured to generate one or more challenges. For example, the processor 122 may be configured to generate a first challenge. In some examples, the processor 122 may be configured to challenge the authenticator 110 to login. The first challenge may include an identifier, such as a user identifier or a site identifier, that may be used to select an appropriate FIDO key pair. The first challenge may further include an unpredictable number, which may be given by the server 120, that is used to prevent replay. For example, for each instance of authentication, a new unpredictable number will be needed and thus the unpredictable number will be different each time. In this manner, this avoids utilizing a signature of the old unpredictable number and instead utilizes the number for the instant session of authentication.

The authenticator 110, such as processor 112 of a mobile device, may be configured to prompt one or more entries of the first device 105. For example, the one or more entries may include at least one selected from the group of a tap, a swipe, a wave, or the like, and/or any combination thereof. Thus, the communication interface 107 of the first device 105 may enter a communication field of the authenticator 110, such as the communication field of the mobile device. The first device 105 may be configured to, depending on the first instruction received from the authenticator 110, generate or retrieve a FIDO key pair associated with a specific user or site. The generated or retrieved FIDO key pair may be read by the authenticator 110. The FIDO key pair may include a FIDO private key which may be read by the authenticator 110 from the first device 105 and may be used by the authenticator 110 to sign the first challenge resulting in a signed challenge data. The FIDO private key may be retrieved via entry of a communication interface 107 of the first device 105 into a communication field. In some examples, the FIDO private key may be encrypted by the first device 105 prior to its transfer to the authenticator 110, in which case the processor 112 of the mobile device may be configured to decrypt the received encrypted FIDO private key. The server 120 may receive the signed challenge data from the authenticator 110, such as the processor 112 of the mobile device. The server 120 may perform validation of the signed challenge data. For example, the server 120 may validate the signed challenge data with the FIDO public key that was stored when the user registered to the site. The validation may comprise the result of the authentication process, which includes signature verification.

In some examples, transmission of the FIDO private key from the first device 105 to the authenticator 110 may be prevented. For example, over the air (OTA) transmission of the FIDO private key is avoided when the first device 105 performs the signing of the first challenge. Thus, the first challenge and the site or user identifier information is transmitted to the first device 105 from the authenticator, which thereby distributes its computation to the first device 105 through near field communication (NFC) via a proxy protocol.

In some examples, the FIDO private key may be generated based on a master key and an identifier associated with the authentication request using one or more cryptographic algorithms. For example, the identifier may include a site identifier and combined with the master key to produce another key pair. The first device 105 may be configured to store a finite number of keys in memory 104 so as to avoid having to regenerate keys. In other examples, the first instruction from the authenticator 110 may include a request to regenerate the FIDO private key, such as a private key which is part of a public/private key pair, by the first device 105.

In some examples, the master key be stored in memory 104 on the first device 105, and the master key may be combined with the site identifier on the first device 105 to generate the FIDO private key. In other examples, the master key may be transferred from the first device 105 to the authenticator 110, in which the combining of the master key and the site identifier is performed by the authenticator 110 to generate the FIDO private key.

In some examples, rather than generating or storing the FIDO private key in the first device 105, the FIDO private key may be generated or stored in a secure element belonging to the authenticator 110. For example, the FIDO private key may be stored in a secure element maintained by an authenticator 110. In some examples, the secure element may comprise a tamper-resistant secure storage area in which one or more keys may be securely stored and retrieved by the server 120.

After instruction generation, the authenticator 110 may be configured to transmit the first instruction to the first device 105. The authenticator 110 may be configured to receive, based on the first instruction, the FIDO private key from the first device 105. The first instruction may be transmitted to the processor 102 of the first device 105 by the authenticator 110. For example, the processor 102 of the first device 105 may be configured to generate the FIDO private key. The processor 102 of the first device 105 may be configured to transmit the FIDO private key. For example, the processor 102 of the first device 105 may be configured to transmit the FIDO private key to the authenticator 110, such as an application 116 comprising instructions for execution on the authenticator 110. As previously explained above, the authenticator 110 may be, without limitation, a mobile device such as a laptop or a tablet or a phone. In some examples, the FIDO private key may be transmitted and received via one or more channels. For example, the FIDO private key may be transmitted and received via an out-of-band channel. The processor 102 of the first device 105 may be configured to transmit the FIDO private key to the authenticator 110 via entry of the communication interface 107 into a communication field of the authenticator 110. In some examples, the entry may be associated with one or more gestures, including but not limited to one or more taps, swipes, waves, and/or any combination thereof. The authenticator 110 may be configured to transmit the first FIDO key to the processor 122 of the server 120 for validation, and thus the authenticator 110 may be configured to serve as an intermediary device between the first device 105 and the processor 122 of the server 120.

The processor 122 may be configured to validate the signed challenge data transmitted from the authenticator 110 using a second FIDO key, such as a FIDO public key, which may be part of the public/private key pair as previously explained. For example, the application 116 comprising instructions for execution on the authenticator 110 may be configured to sign the first challenge issued by the website using the FIDO private key. Once the challenge has been signed by authenticator 110, it may be transmitted to the processor 122 for validation using the FIDO public key stored in memory 124 of the server 120.

The processor 122 may be configured to generate a second instruction. For example, the second instruction may include a second request to transmit input data. After instruction generation, the processor 122 may be configured to transmit the second instruction. For example, the processor 122 may be configured to transmit the second instruction to the authenticator 110. In some examples, the second instruction may be forwarded by the processor 122 to the application 116 via one or more push notifications. In some examples, the second instruction may be transmitted by the processor 122 after evaluation by processor 122 and/or database 125 of one or more conditions. For example, at least one of the one or more conditions may include determining a threshold number of authentication requests over a predetermined time period. For example, the processor 122 and/or database 125 may be configured to determine whether an abnormal number of transactions or requests were performed within any number of seconds, minutes, hours, days, weeks, months, years, etc. In another example, at least one of the one or more conditions may include determining whether misuse or fraud associated with an account and/or user occurred. For example, the processor 122 and/or database 125 may be configured to determine whether a user transaction history is indicative of excessive amount of purchases or abnormal locations. In this manner, conditional multifactor authentication may be implemented to improve security, which may trigger transmittal of the second instruction for receiving the input data.

The processor 122 may be configured to receive, based on the second instruction, the input data. The processor 122 may be configured to receive the input data from the authenticator 110, such as from application 116 comprising instructions for execution on the second device. The input data may include at least one selected from the group of biometric data and credential data. For example, the input data may include biometric data, credential data, and/or any combination thereof. Without limitation, the biometric data may include at least one selected from the group of a fingerprint, a facial scan, a retinal scan, a voice recognition, and/or any combination thereof. In some examples, the input data may additionally and/or alternatively include credential data. Without limitation, the login data may include at least one selected from the group of an entry of a user name, a password, an account number, a security code, a one-time passcode, an answer to a security question, and/or any combination thereof The processor 122 may be configured to complete the authentication request by authenticating the input data. For example, the processor 122 may be configured to generate one or more outcomes by comparing the received input data with reference input data. In some examples, the reference input data may be stored in memory 124 of the server 120. In other examples, the reference input data may be requested by the processor 122. For example, the processor 122 may be configured to receive, via one or more requests, reference input data, or alternatively transmit the input data for comparison with the reference input data to a database 125. For example, the processor 122 of the server 120 may be configured to generate an outcome indicative of successful authentication when it results in a successful match based on the comparison between the received input data with reference input data. In another example, the processor 122 of the server 120 may be configured to generate an outcome of unsuccessful authentication when it results in an unsuccessful match based on the comparison between the received input data with reference input data. Upon determination of an unsuccessful authentication, the processor 122 of the server 120 may be configured to re-authenticate the input data up to and including a predetermined number of attempts before successfully authenticating the input data so as to complete the authentication request, or aborting the completion of the authentication request. In this manner, system 100 may implement with distributed storage, cloud-based storage, and other forms of storage in support of the aforementioned functionalities.

Figure 2A:
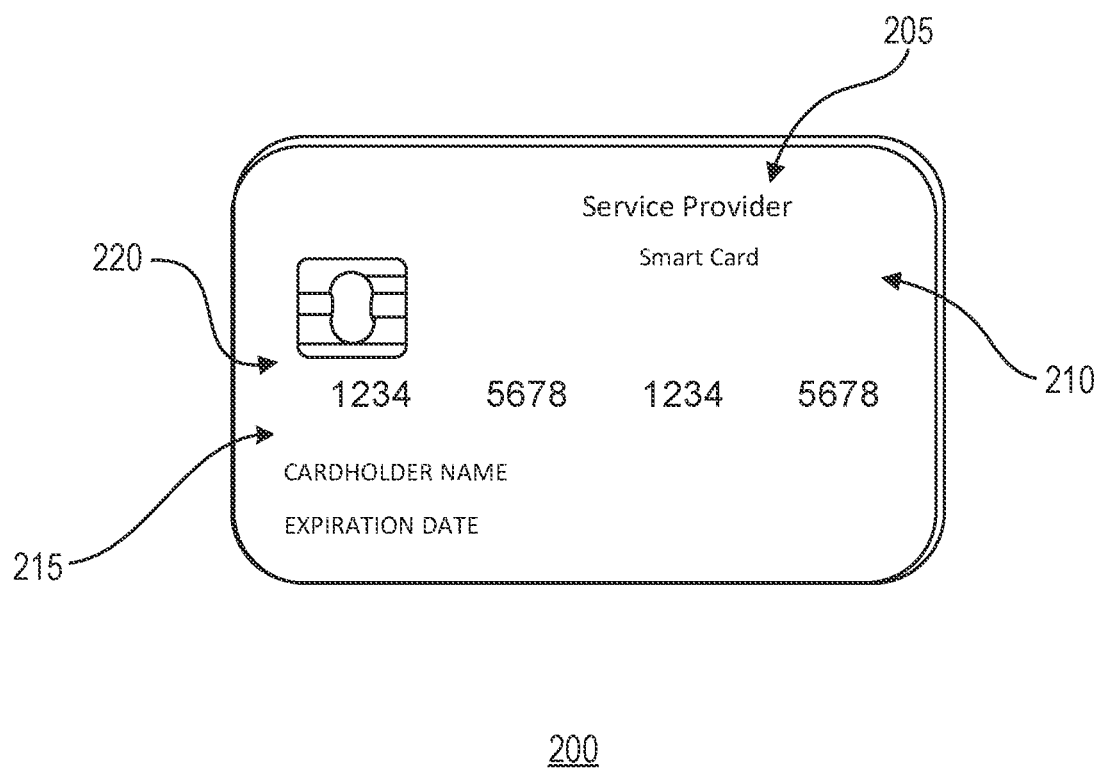
FIG. 2A is an illustration of a first device according to an exemplary embodiment.
Figure 2B:
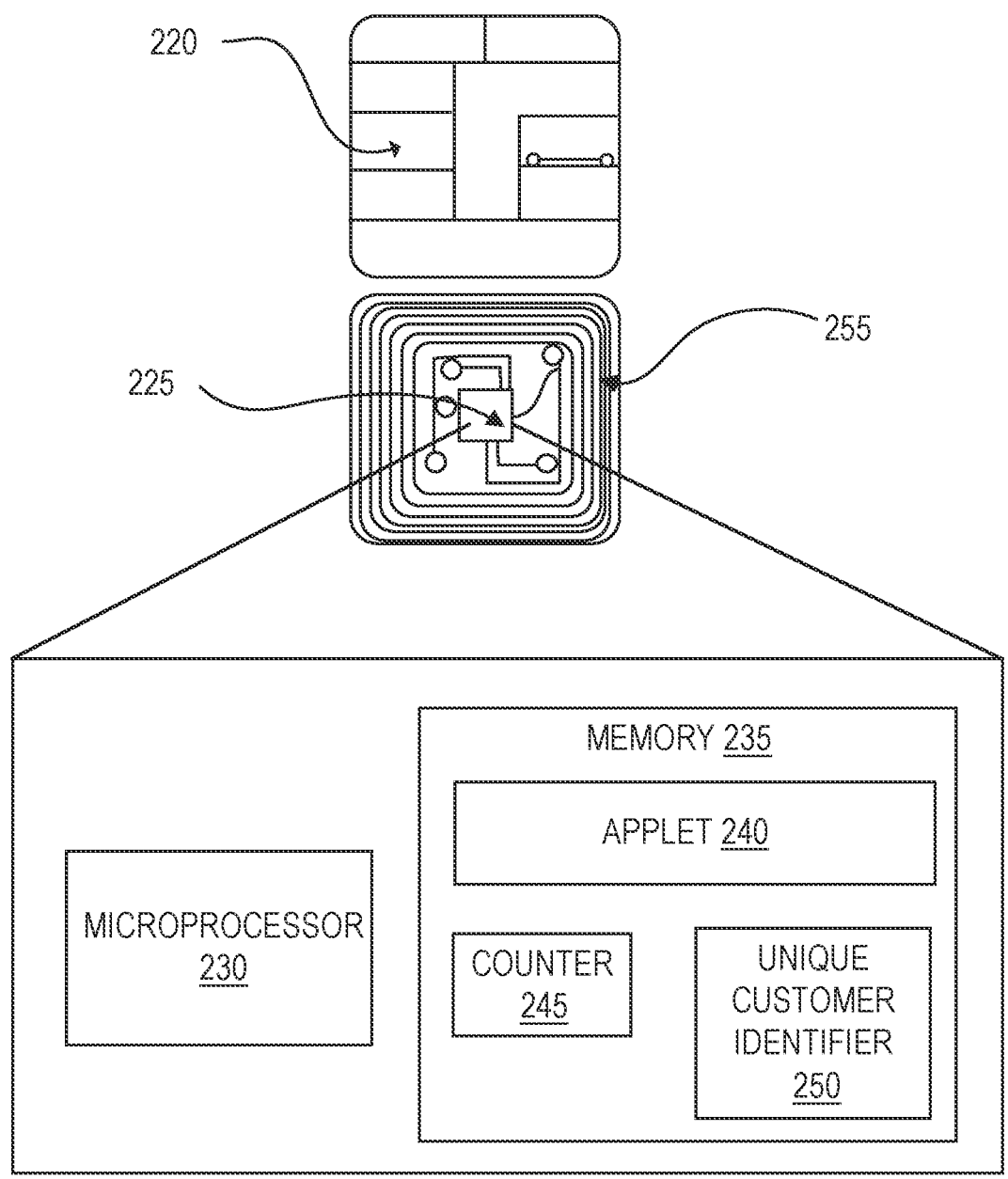
FIG. 2B is an illustration of a contact pad of a first device according to an exemplary embodiment.

FIG. 2A illustrates one or more first devices 200. First device 200 may reference the same or similar components of first device 105, as explained above with respect to FIG. 1. Although FIG. 2A and 2B illustrate single instances of components of first device 200, any number of components may be utilized.

First device 200 may be configured to communicate with one or more components of system 100. First device 200 may comprise a contact-based card (e.g., a card read by a swipe of a magnetic stripe or by insertion into a chip reader) or a contactless card, and the first device 200 may comprise a payment card, such as a credit card, debit card, or gift card, issued by a service provider 205 displayed on the front or back of the first device 200. In some examples, the first device 200 is not related to a payment card, and may comprise, without limitation, an identification card, a membership card, and a transportation card. In some examples, the payment card may comprise a dual interface contactless payment card.

First device 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the first device 200 may have physical characteristics compliant with the ID-1 format of the ISO/IEC 7810 standard, and the first device 200 may otherwise be compliant with the ISO/IEC 14443 standard. However, it is understood that the first device 200 according to the present disclosure may have different characteristics, and the present disclosure does not require implementation in a payment card.

The first device 200 may also include identification information 215 displayed on the front and/or back of the card, and a contact pad 220. The contact pad 220 may be configured to establish contact with another communication device, including but not limited to a user device, smartphone, laptop, desktop, or tablet computer. The first device 200 may also include processing circuitry, antenna and other components not shown in FIG. 2A. These components may be located behind the contact pad 220 or elsewhere on the substrate 210. The first device 200 may also include a magnetic strip or tape, which may be located on the back of the card (not shown in FIG. 2A).

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the first device 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contact-based or contactless cards, such as Java Card applet. However, it is understood that applets 240 are not limited to Java Card applets, and instead may be any software application operable on contact-based or contactless cards or other devices having limited memory. The one or more counters 245 may comprise a numeric counter sufficient to store an integer. The customer identifier 250 may comprise a unique alphanumeric identifier assigned to a user of the first device 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the first device 200 may comprise one or more antennas 255. The one or more antennas 255 may be placed within the first device 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of first device 200 may act as the secondary of an air core transformer. The terminal may communicate with the first device 200 by cutting power or amplitude modulation. The first device 200 may infer the data transmitted from the terminal using the gaps in the first device's power connection, which may be functionally maintained through one or more capacitors. The first device 200 may communicate back by switching a load on the first device's coil or load modulation. Load modulation may be detected in the terminal's coil through interference.

Figure 3:
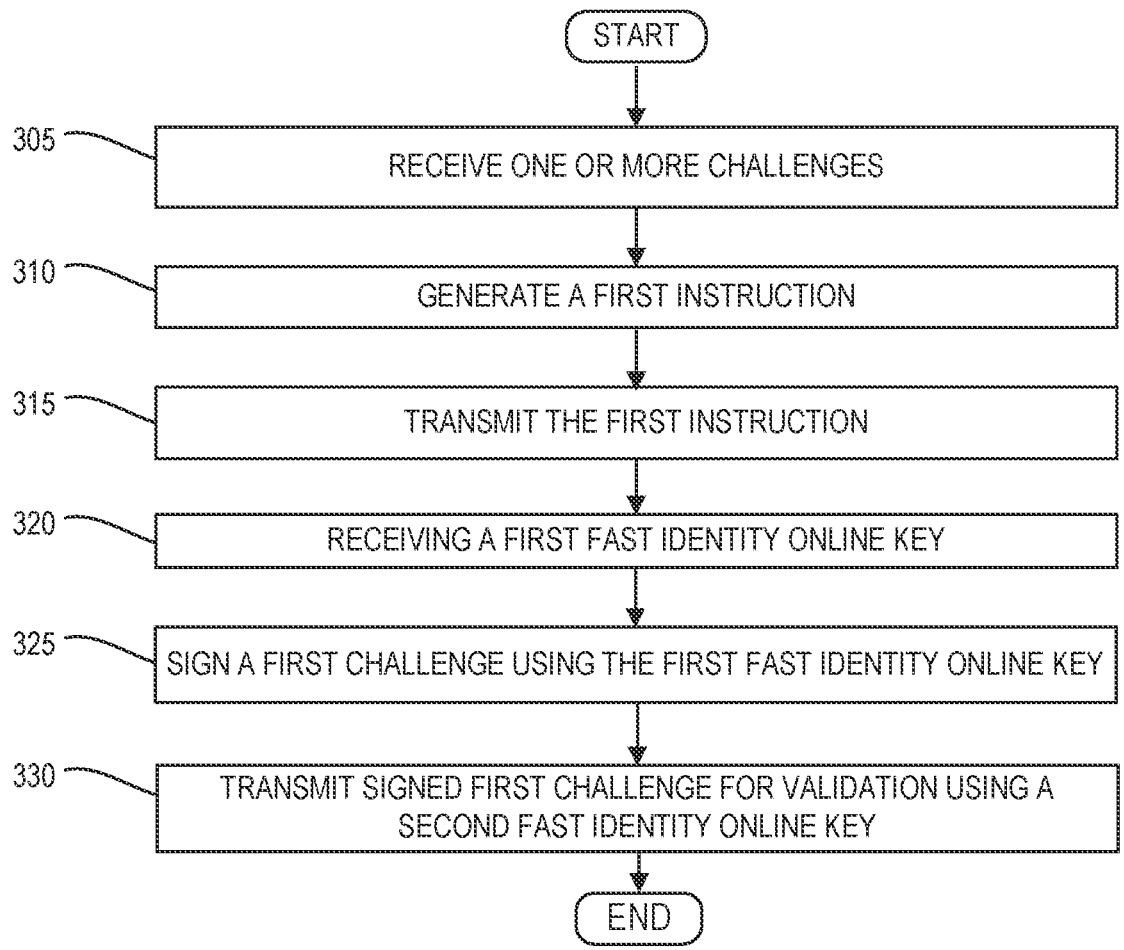
FIG. 3 depicts an authentication method according to an exemplary embodiment.

FIG. 3 depicts a method 300 of authentication. FIG. 3 may reference the same or similar components of system 100 of FIG. 1, and first device 200 of FIG. 2A and FIG. 2B.

At block 305, the method 300 may include receiving, at a processor, one or more challenges. For example, a relying party or server may be configured to generate a first challenge. In some examples, the relying party may be configured to challenge the authenticator, such as a processor of a mobile device, to login. The first challenge may include an identifier, such as a user identifier or a site identifier, that may be used to select an appropriate FIDO key pair. The first challenge may further include an unpredictable number, which may be given by the relying party, that is used to prevent replay. For example, for each instance of authentication, a new unpredictable number will be needed and thus the unpredictable number will be different each time. In this manner, this avoids utilizing a signature of the old unpredictable number and instead utilizes the number for the instant session of authentication.

In some examples, the first request may comprise an authentication request. The authentication request may comprise a request for Fast Identity Online 2 (FIDO2) website registration. The processor may be configured to generate one or more instructions. For example, the processor may be configured to generate a first instruction. Each instruction may include one or more requests. The first instruction may include a first request to retrieve a first key from the processor of the first device. The key may comprise a FIDO key. The first key may be retrieved via entry of a communication interface of the first device into a communication field. In some examples, the first instruction may include a request to generate the first key by the processor of the first device. In other examples, the first instruction may include a request to regenerate the first FIDO key, such as a private key which is part of a public/private key pair, by the processor of the first device.

At block 310, the method 300 may include generating, by the processor, a first instruction including a request to retrieve a first Fast Identity Online (FIDO) key from a first device. For example, based on the first challenge received from the relying party, the authenticator, such as processor of a mobile device, may be configured to prompt one or more entries of a first device by generating one or more instructions. For example, the one or more entries may include at least one selected from the group of a tap, a swipe, a wave, or the like, and/or any combination thereof. The first instruction may include a request to generate the first FIDO key by the first device. In some examples, the first FIDO key may be generated based on a master key and an identifier associated with the first request using one or more cryptographic algorithms. For example, the identifier may include a site identifier and combined with the master key to produce a key pair. In some examples, the master key be stored on the first device, and the master key may be combined with the site identifier on the first device to generate the private key. In other examples, the master key may be transferred from the first device to the application comprising instructions for execution on the second device, in which the combining of the master key and the site identifier is performed by the application of the second device to generate the private key. In some examples, rather than generating or storing the FIDO private key in the first device, the first FIDO key may be generated or stored in a secure element belonging to the second device. For example, the FIDO private key may be stored in a secure element maintained by the second device. In some examples, the secure element may comprise a tamper-resistant secure storage area in which one or more keys may be securely stored and retrieved by the server.

At block 315, the method 300 may include transmitting, by the processor, the first instruction. For example, the processor may be configured to transmit the first instruction to the first device. In some examples, the first instruction may be transmitted to the processor of the first device by the authenticator. After instruction generation, the authenticator may be configured to transmit the first instruction to the first device.

At block 320, the method 300 may include receiving the first FIDO key. For example, a communication interface of the first device may enter a communication field of the authenticator, such as the communication field of the mobile device, to transfer the first FIDO key. The first device may be configured to, depending on the first instruction received from the authenticator, generate or retrieve a FIDO key pair associated with a specific user or site. The generated or retrieved FIDO key pair may be read by the authenticator. The FIDO key pair may include a FIDO private key which may be read by the authenticator from the first device and may be used by the authenticator to sign the first challenge resulting in a signed challenge data. The FIDO private key may be retrieved via entry of a communication interface of the first device into a communication field. In some examples, the FIDO private key may be encrypted by the first device prior to its transfer to the authenticator, in which case the processor of the mobile device may be configured to decrypt the received encrypted FIDO private key.

In some examples, the FIDO private key may be generated based on a master key and an identifier associated with the authentication request using one or more cryptographic algorithms. For example, the identifier may include a site identifier and combined with the master key to produce another key pair. The first device may be configured to store a finite number of keys in its memory so as to avoid having to regenerate keys. In other examples, the first instruction from the authenticator may include a request to regenerate the FIDO private key, such as a private key which is part of a public/private key pair, by the first device.

In some examples, the master key be stored in memory on the first device, and the master key may be combined with the site identifier on the first device to generate the FIDO private key. In other examples, the master key may be transferred from the first device to the authenticator, in which the combining of the master key and the site identifier is performed by the authenticator to generate the FIDO private key.

In some examples, transmission of the FIDO private key from the first device to the authenticator may be prevented. For example, over the air (OTA) transmission of the FIDO private key is avoided when the first device performs the signing of the first challenge. Thus, the first challenge and the site or user identifier information is transmitted to the first device from the authenticator, which thereby distributes its computation to the first device through near field communication (NFC) via a proxy protocol.

In some examples, rather than generating or storing the FIDO private key in the first device, the FIDO private key may be generated or stored in a secure element belonging to the authenticator. For example, the FIDO private key may be stored in a secure element maintained by a second device. In some examples, the secure element may comprise a tamper-resistant secure storage area in which one or more keys may be securely stored and retrieved by the relying party.

In some examples, the processor of the first device may be configured to generate the FIDO private key. The processor of the first device may be configured to transmit the FIDO private key. For example, the processor of the first device may be configured to transmit the FIDO private key to the authenticator, such as an application comprising instructions for execution on a second device. As previously explained above, the authenticator may be, without limitation, a mobile device such as a laptop or a tablet or a phone. In some examples, the FIDO private key may be transmitted and received via one or more channels. For example, the FIDO private key may be transmitted and received via an out-of-band channel. The processor of the first device may be configured to transmit the FIDO private key to the authenticator via entry of the communication interface of the first device into a communication field of the authenticator. In some examples, the entry may be associated with one or more gestures, including but not limited to one or more taps, swipes, waves, and/or any combination thereof.

For example, the processor of the first device may be configured to generate the first FIDO key. The processor of the first device may be configured to transmit the first FIDO key. For example, the processor of the first device may be configured to transmit the first FIDO key to an application comprising instructions for execution on a second device. As previously explained above, the second device may be, without limitation, a mobile device such as a laptop or a tablet or a phone. In some examples, the first FIDO key may be transmitted and received via one or more channels. For example, the first FIDO key may be transmitted and received via an out-of-band channel. The processor of the first device may be configured to transmit the first FIDO key to the application of the second device via entry of the communication interface into a communication field of the second device. In some examples, the entry may be associated with one or more gestures, including but not limited to one or more taps, swipes, waves, and/or any combination thereof. The application of the second device may be configured to transmit the first FIDO key to the processor of the server for validation, and thus the second device may be configured to serve as an intermediary device between the first device and the processor.

At block 325, the method 300 may include signing, by the processor, the one or more challenges using the first FIDO key.

At block 330, the method 300 may include transmitting, by the processor, one or more signed challenges for validation using a second FIDO key. For example, the processor may be configured to transmit one or more signed challenges to the relying party. The relying party may receive the signed challenge data from the authenticator, such as the processor of the mobile device. The relying party may perform validation of the signed challenge data. For example, the relying party may validate the signed challenge data with the FIDO public key that was stored when the user registered to the site. The validation may comprise the result of the authentication process, which includes signature verification. The authenticator may be configured to transmit the first FIDO key to the processor of the relying party for validation, and thus the authenticator may be configured to serve as an intermediary device between the first device and the processor of the relying party.

The relying party may be configured to validate the FIDO private key via a website FIDO service. The relying party may be configured to validate the signed challenge data transmitted from the authenticator using a second FIDO key, such as a FIDO public key, which may be part of the public/private key pair as previously explained. For example, the application comprising instructions for execution on the second device may be configured to sign the first challenge issued by the website using the FIDO private key. Once the challenge has been signed by authenticator, it may be transmitted to the processor for validation using the FIDO public key stored in memory of the server.

The relying party may be configured to generate a second instruction. For example, the second instruction may include a second request to transmit input data. After instruction generation, the relying party may be configured to transmit the second instruction. For example, the relying party may be configured to transmit the second instruction to the authenticator. In some examples, the second instruction may be forwarded by the relying party to the application via one or more push notifications. In some examples, the second instruction may be transmitted by the relying party after evaluation by the relying party and/or a database of one or more conditions. For example, at least one of the one or more conditions may include determining a threshold number of authentication requests over a predetermined time period. For example, the relying party and/or database may be configured to determine whether an abnormal number of transactions or requests were performed within any number of seconds, minutes, hours, days, weeks, months, years, etc. In another example, at least one of the one or more conditions may include determining whether misuse or fraud associated with an account and/or user occurred. For example, the relying party and/or the database may be configured to determine whether a user transaction history is indicative of excessive amount of purchases or abnormal locations. In this manner, conditional multifactor authentication may be implemented to improve security, which may trigger transmittal of the second instruction for receiving the input data.

The relying party may be configured to receive, based on the second instruction, the input data. The relying party may be configured to receive the input data from the authenticator, such as from the application comprising instructions for execution on the second device. The input data may include at least one selected from the group of biometric data and credential data. For example, the input data may include biometric data, credential data, and/or any combination thereof. Without limitation, the biometric data may include at least one selected from the group of a fingerprint, a facial scan, a retinal scan, a voice recognition, and/or any combination thereof. In some examples, the input data may additionally and/or alternatively include credential data. Without limitation, the login data may include at least one selected from the group of an entry of a user name, a password, an account number, a security code, a one-time passcode, an answer to a security question, and/or any combination thereof.

The relying party may be configured to complete the authentication request by authenticating the input data. For example, the relying party may be configured to generate one or more outcomes by comparing the received input data with reference input data. In some examples, the reference input data may be stored in a memory of the relying party. In other examples, the reference input data may be requested by the relying party. For example, the relying party may be configured to receive, via one or more requests, reference input data, or alternatively transmit the input data for comparison with the reference input data to the database. For example, the processor of the relying party may be configured to generate an outcome indicative of successful authentication when it results in a successful match based on the comparison between the received input data with reference input data. In another example, the processor of the relying party may be configured to generate an outcome of unsuccessful authentication when it results in an unsuccessful match based on the comparison between the received input data with reference input data. Upon determination of an unsuccessful authentication, the processor of the relying party may be configured to re-authenticate the input data up to and including a predetermined number of attempts before successfully authenticating the input data so as to complete the authentication request, or aborting the completion of the authentication request. In this manner, the authentication system may implement with distributed storage, cloud-based storage, and other forms of storage in support of the aforementioned functionalities.

Figure 4:
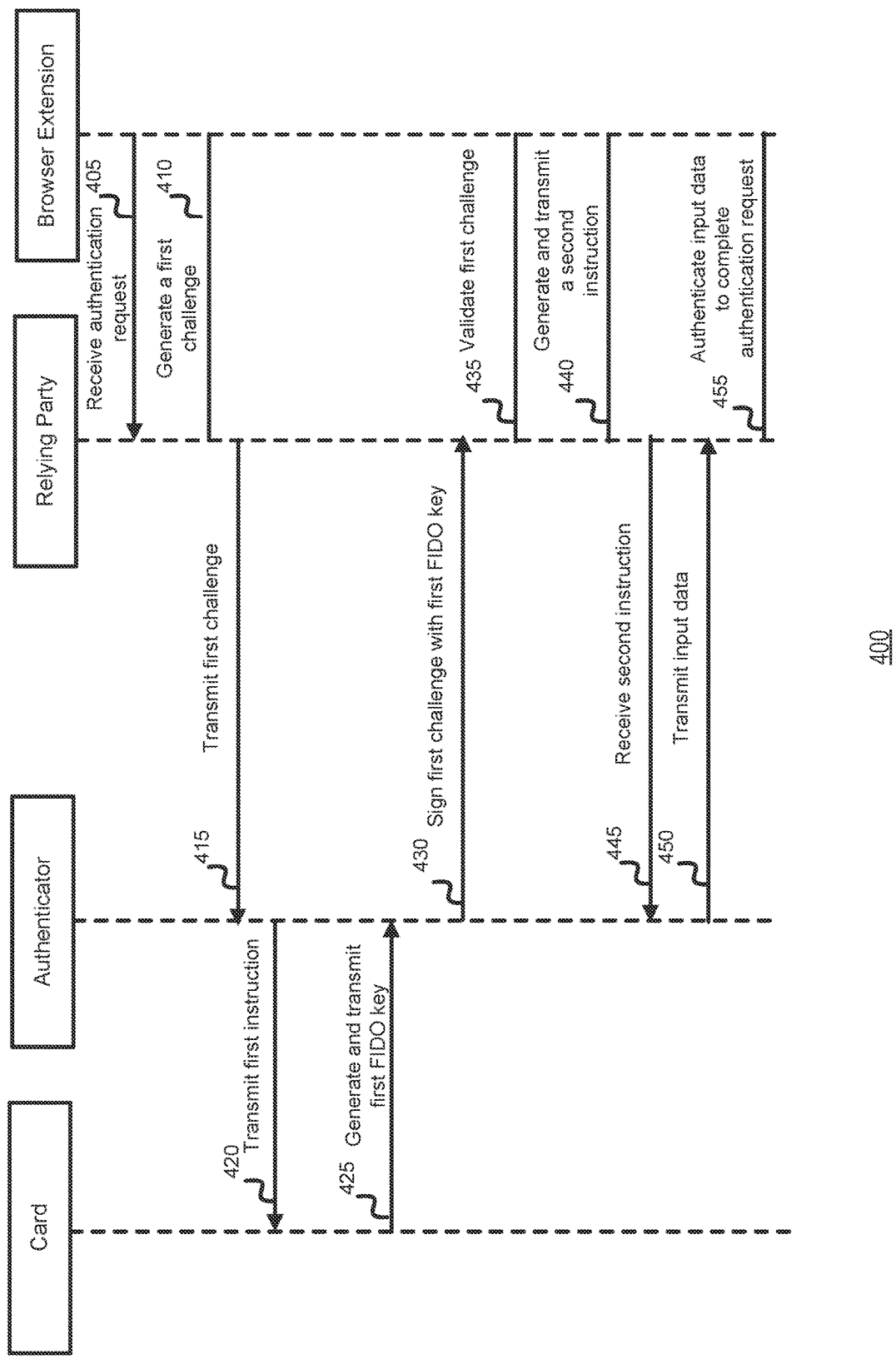
FIG. 4 depicts a sequence diagram of an authentication process according to an exemplary embodiment.

FIG. 4 depicts a sequence diagram 400 of an authentication process according to an exemplary embodiment. FIG. 4 may reference the same or similar components of system 100, first device 200 of FIG. 2A and FIG. 2B, and method 300 of FIG. 3.

At step 405, a processor may be configured to receive an authentication request. As an example, the processor may be part of a relying party or server. In some examples, the authentication request may comprise a request for Fast Identity Online 2 (FIDO2) website registration. For example, the request may be received from a browser extension.

At step 410, the processor may be configured to generate, responsive to the authentication request, one or more challenges. For example, the processor may be configured to generate a first challenge. In some examples, the relying party may be configured to challenge the authenticator, such as a processor of a mobile device, to login. The first challenge may include an identifier, such as a user identifier or a site identifier, that may be used to select an appropriate FIDO key pair. The first challenge may further include an unpredictable number, which may be given by the relying party, that is used to prevent replay. For example, for each instance of authentication, a new unpredictable number will be needed and thus the unpredictable number will be different each time. In this manner, this avoids utilizing a signature of the old unpredictable number and instead utilizes the number for the instant session of authentication.

At step 415, the processor may be configured to transmit the first challenge. For example, the processor may be configured to transmit the first instruction to an authenticator, such as the application comprising instructions for execution on a device, including but not limited to a mobile device.

At step 420, a first instruction may be transmitted to a first device. For example, the first instruction may be generated and/or transmitted by the authenticator to a processor of a card. The processor may be configured to generate one or more instructions. For example, the processor may be configured to generate a first instruction. Each instruction may include one or more requests. The first instruction may include a first request to retrieve a first key from the processor of the first device. The key may comprise a FIDO key. The first key may be retrieved via entry of a communication interface of the first device into a communication field, such as the communication field of the authenticator. In some examples, the first instruction may include a request to generate the first key by the processor of the first device. In other examples, the first instruction may include a request to regenerate the first FIDO key, such as a private key which is part of a public/private key pair, by the processor of the first device.

For example, based on the first challenge received from the relying party, the authenticator, such as processor of the mobile device, may be configured to prompt one or more entries of a first device by generating one or more instructions. For example, the one or more entries may include at least one selected from the group of a tap, a swipe, a wave, or the like, and/or any combination thereof. The first instruction may include a request to generate the first FIDO key by the first device. In some examples, the first FIDO key may be generated based on a master key and an identifier associated with the first request using one or more cryptographic algorithms. For example, the identifier may include a site identifier and combined with the master key to produce a key pair. In some examples, the master key be stored on the first device, and the master key may be combined with the site identifier on the first device to generate the private key.

At step 425, the processor of the first device may be configured to generate and transmit the first FIDO key. For example, a communication interface of the first device may enter a communication field of the authenticator, such as the communication field of the mobile device, to transfer the first FIDO key. The first device may be configured to, depending on the first instruction received from the authenticator, generate or retrieve a FIDO key pair associated with a specific user or site. The generated or retrieved FIDO key pair may be read by the authenticator. The FIDO key pair may include a FIDO private key which may be read by the authenticator from the first device and may be used by the authenticator to sign the first challenge resulting in a signed challenge data. The FIDO private key may be retrieved via entry of a communication interface of the first device into a communication field. In some examples, the FIDO private key may be encrypted by the first device prior to its transfer to the authenticator, in which case the processor of the mobile device may be configured to decrypt the received encrypted FIDO private key.

In some examples, the FIDO private key may be generated based on a master key and an identifier associated with the authentication request using one or more cryptographic algorithms. For example, the identifier may include a site identifier and combined with the master key to produce another key pair. The first device may be configured to store a finite number of keys in its memory so as to avoid having to regenerate keys. In other examples, the first instruction from the authenticator may include a request to regenerate the FIDO private key, such as a private key which is part of a public/private key pair, by the first device.

In some examples, the master key be stored in memory on the first device, and the master key may be combined with the site identifier on the first device to generate the FIDO private key. In other examples, the master key may be transferred from the first device to the authenticator, in which the combining of the master key and the site identifier is performed by the authenticator to generate the FIDO private key.

In some examples, transmission of the FIDO private key from the first device to the authenticator may be prevented. For example, over the air (OTA) transmission of the FIDO private key is avoided when the first device performs the signing of the first challenge. Thus, the first challenge and the site or user identifier information is transmitted to the first device from the authenticator, which thereby distributes its computation to the first device through near field communication (NFC) via a proxy protocol.

In some examples, rather than generating or storing the FIDO private key in the first device, the FIDO private key may be generated or stored in a secure element belonging to the authenticator. For example, the FIDO private key may be stored in a secure element maintained by a second device. In some examples, the secure element may comprise a tamper-resistant secure storage area in which one or more keys may be securely stored and retrieved by the relying party.

In some examples, the processor of the first device may be configured to generate the FIDO private key. The processor of the first device may be configured to transmit the FIDO private key. For example, the processor of the first device may be configured to transmit the FIDO private key to the authenticator, such as an application comprising instructions for execution on a second device. As previously explained above, the authenticator may be, without limitation, a mobile device such as a laptop or a tablet or a phone. In some examples, the FIDO private key may be transmitted and received via one or more channels. For example, the FIDO private key may be transmitted and received via an out-of-band channel. The processor of the first device may be configured to transmit the FIDO private key to the authenticator via entry of the communication interface of the first device into a communication field of the authenticator. In some examples, the entry may be associated with one or more gestures, including but not limited to one or more taps, swipes, waves, and/or any combination thereof.

At step 430, the authenticator may be configured to receive the first FIDO key. For example, the application of the second device may be configured to receive the first FIDO private key from the processor of the first device. The authenticator may be configured to sign the first challenge using the received first FIDO key. The authenticator may be configured to transmit the signed first challenge to the relying party for validation.

At step 435, the processor of the relying party or server may be configured to validate the signed first challenge. For example, the processor of the relying party or server may be configured to receive the signed first challenge from the authenticator. For example, the relying party may validate the signed challenge data with the FIDO public key that was stored when the user registered to the site. The validation may comprise the result of the authentication process, which includes signature verification. The authenticator may be configured to transmit the first FIDO key to the processor of the relying party for validation, and thus the authenticator may be configured to serve as an intermediary device between the first device and the processor of the relying party.

At step 440, the processor of the relying party or server may be configured to generate a second instruction. For example, the second instruction may include a second request to transmit input data. In some examples, the processor may be configured to evaluate one or more conditions. For example, the second instruction may be transmitted by the processor after evaluation of one or more conditions. For example, at least one of the one or more conditions may include determining a threshold number of authentication requests over a predetermined time period. For example, the processor may be configured to determine whether an abnormal number of transactions or requests were performed within any number of seconds, minutes, hours, days, weeks, months, years, etc. In another example, at least one of the one or more conditions may include determining whether misuse or fraud associated with an account and/or user occurred. For example, the processor may be configured to determine whether a user transaction history is indicative of excessive amount of purchases or abnormal locations. In this manner, conditional multifactor authentication may be implemented to improve security, which may trigger transmittal of the second instruction for receiving the input data.

At step 445, the authenticator may be configured to receive the second instruction. For example, the processor of the mobile device may be configured to receive, after evaluation of the one or more conditions by the relying party or server, the second instruction from the processor of the relying party or server. In some examples, the second instruction may be forwarded by the processor of the relying party or server to the authenticator, such as the application comprising instructions for execution of the mobile device via one or more push notifications.

At step 450, the authenticator may be configured to transmit, based on the second instruction, the input data. For example, the processor or application of the mobile device may be configured to transmit the input data to the relying party, such as the processor of the server. The input data may include at least one selected from the group of biometric data and credential data. For example, the input data may include biometric data, credential data, and/or any combination thereof. Without limitation, the biometric data may include at least one selected from the group of a fingerprint, a facial scan, a retinal scan, a voice recognition, and/or any combination thereof. In some examples, the input data may additionally and/or alternatively include credential data. Without limitation, the login data may include at least one selected from the group of an entry of a user name, a password, an account number, a security code, a one-time passcode, an answer to a security question, and/or any combination thereof At step 455, the relying party or server may be configured to complete the authentication request by authenticating the input data. For example, the processor of the relying party or server may be configured to receive the input data from the authenticator, such as the processor or application comprising instructions for execution of the mobile device. In some examples, the processor of the relying party or server may be configured to generate one or more outcomes by comparing the received input data with reference input data. In some examples, the reference input data may be stored by the relying party or server. In other examples, the reference input data may be requested by the relying party or server. For example, the processor of the relying party or server may be configured to receive, via one or more requests, reference input data, or alternatively transmit the input data for comparison with the reference input data to a database. For example, the relying party or server may be configured to generate an outcome indicative of successful authentication when it results in a successful match based on the comparison between the received input data with reference input data. In another example, the relying party or server may be configured to generate an outcome of unsuccessful authentication when it results in an unsuccessful match based on the comparison between the received input data with reference input data. Upon determination of an unsuccessful authentication, the relying party or server may be configured to re-authenticate the input data up to and including a predetermined number of attempts before successfully authenticating the input data so as to complete the authentication request, or aborting the completion of the authentication request. In this manner, sequence diagram 400 of authentication process may implement with distributed storage, cloud-based storage, and other forms of storage in support of the aforementioned functionalities.

Figure 5:
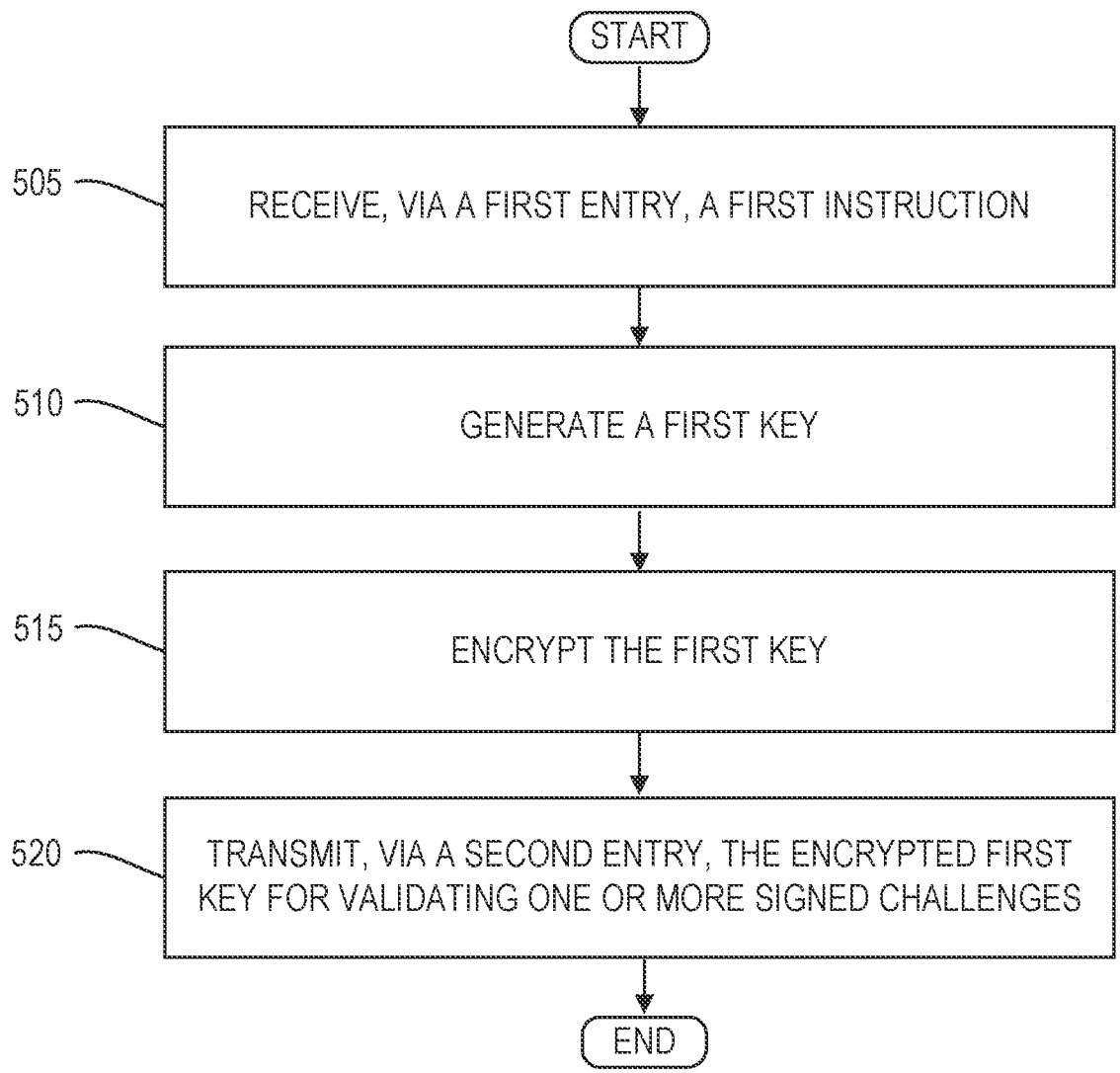
FIG. 5 depicts an authentication method according to an exemplary embodiment.

FIG. 5 depicts a method of 500 of authentication according to an exemplary embodiment. FIG. 5 may reference the same or similar components of system 100, first device 200 of FIG. 2A and FIG. 2B, method 300 of FIG. 3, and sequence diagram 400 of FIG. 4.

At block 505, the method 500 may include receiving, at a processor, a first instruction. The processor may be coupled to a memory comprising an application which includes instructions for execution on a first device, such as a card. In some examples, the first instruction may be associated with completion of an authentication request. For example, the authentication request may comprise a request for Fast Identity Online 2 (FIDO2) website registration. The first instruction may be a part of one or more instructions that are generated and/or transmitted by a processor of an authenticator, such as an application comprising instructions for execution on a second device, such as a client device or mobile device. For example, the processor of the authenticator may be configured to generate a first instruction. Each instruction may include one or more requests. The first instruction may include a first request to generate or retrieve a first key from the processor of a the first device. The key may comprise a FIDO key, such as a FIDO private key.

The first instruction may include a request to retrieve a first Fast Identity Online (FIDO) key from a first device, including but not limited to a card. The first instruction may include a request to generate the first FIDO key by the first device. In some examples, the first FIDO key may be generated based on a master key and an identifier associated with the first request using one or more cryptographic algorithms. For example, the identifier may include a site identifier and combined with the master key to produce a key pair. In some examples, the master key be stored on the first device, and the master key may be combined with the site identifier on the first device to generate the private key. In some examples, rather than generating or storing the FIDO private key in the first device, the first FIDO key may be generated or stored in a secure element belonging to an authenticator or second device, such as a client device that may include a mobile device. For example, the FIDO private key may be stored in a secure element maintained by the second device. In some examples, the secure element may comprise a tamper-resistant secure storage area in which one or more keys may be securely stored and retrieved by the authenticator or relying party server. For example, the authenticator may be configured to transmit the first instruction to the first device, such that the authenticator may be configured to act as an intermediary device between the first device and the relying party or server.

At block 510, the method 500 may include generating a first key. For example, the first key may be retrieved via entry of a communication interface of the second device into a communication field of the authenticator or client device, such as a mobile device. In some examples, the first instruction may include a request to generate the first key by the first device. In other examples, the first instruction may include a request to regenerate the first FIDO key, such as a private key which is part of a public/private key pair, by the first device. The authenticator, such as the processor of the mobile device, may be configured to prompt one or more entries of the first device. For example, the one or more entries may include at least one selected from the group of a tap, a swipe, a wave, or the like, and/or any combination thereof. Thus, a communication interface of the first device may enter a communication field of the authenticator, such as the communication field of the mobile device. The first device may be configured to, based on the first instruction received from the authenticator, generate or retrieve a FIDO key pair associated with a specific user or site. The processor of the first device may be configured to receive the first instruction from the authenticator via a first entry and transmit the FIDO private key to the authenticator via a second entry of the communication interface of the first device into a communication field of the authenticator. In some examples, the one or more entries may be associated with one or more gestures, including but not limited to one or more taps, swipes, waves, and/or any combination thereof.

In some examples, the FIDO private key may be generated based on a master key and an identifier associated with the authentication request using one or more cryptographic algorithms. For example, the identifier may include a site identifier and combined with the master key to produce another key pair. The first device may be configured to store a finite number of keys in its memory so as to avoid having to regenerate keys. In other examples, the first instruction from the authenticator may include a request to regenerate the FIDO private key, such as a private key which is part of a public/private key pair, by the first device.

In some examples, the master key be stored in memory on the first device, and the master key may be combined with the site identifier on the first device to generate the FIDO private key. In other examples, the master key may be transferred from the first device to the authenticator, in which the combining of the master key and the site identifier is performed by the authenticator to generate the FIDO private key.

In some examples, rather than generating or storing the FIDO private key in the first device, the FIDO private key may be generated or stored in a secure element belonging to the authenticator. For example, the FIDO private key may be stored in a secure element maintained by a second device.

At block 515, the method 500 may include encrypting the first key. For example, the FIDO private key may be encrypted by the first device prior to its transfer to the authenticator. Thus, the processor of the mobile device may be configured to decrypt the received encrypted FIDO private key prior to signing one or more challenges.

At block 520, the method 500 may include transmitting the encrypted first key for validation. For example, the processor of the first device may be configured to transmit the encrypted FIDO private key to the authenticator for validation. The generated or retrieved FIDO key pair may be read by the authenticator, including but not limited to via near field communication (NFC). The FIDO key pair may include a FIDO private key which may be read by the authenticator from the first device. The FIDO private key may be retrieved via one or more entries of a communication interface of the first device into a communication field of the authenticator.

In some examples, transmission of the encrypted FIDO private key from the first device to the authenticator may be prevented. For example, over the air (OTA) transmission of the FIDO private key is avoided when the first device is configured to perform signing of a first challenge. Thus, the first challenge and the site or user identifier information is transmitted to the first device from the authenticator, which thereby distributes its computation to the first device through near field communication (NFC) via a proxy protocol.

In some examples, the FIDO private key may be transmitted and received via one or more channels. For example, the FIDO private key may be transmitted and received via an out-of-band channel. In some examples, the authenticator may be configured to receive the FIDO private key from the first device via an out-of-band channel. The authenticator may be configured to transmit the first FIDO key to the processor of the relying party for validation, and thus the authenticator may be configured to serve as an intermediary device between the first device and the processor of the relying party.

In some examples, the relying party may be configured to generate and/or transmit one or more second instructions. For example, the second instruction may include a request to transmit input data. The authenticator, such as the processor of the second device, may be configured to receive the second instruction. For example, the processor of the second device may be configured to receive the request to transmit input data from the relying party or processor of the server. In some examples, the second instruction may be forwarded by the relying party or processor of the server to the authenticator, such as the processor of the second device, via one or more push notifications. In some examples, the second instruction may be received by the authenticator after evaluation of one or more conditions by the relying party or server. For example, at least one of the one or more conditions may include determining a threshold number of authentication requests over a predetermined time period. For example, the relying party may be configured to determine whether an abnormal number of transactions or requests were performed within any number of seconds, minutes, hours, days, weeks, months, years, etc. In another example, at least one of the one or more conditions may include determining whether misuse or fraud associated with an account and/or user occurred. For example, the relying party may be configured to determine whether a user transaction history is indicative of excessive amount of purchases or abnormal locations. In this manner, conditional multifactor authentication may be implemented to improve security, which may trigger transmittal of the second instruction for receiving the input data.

Figure 6:
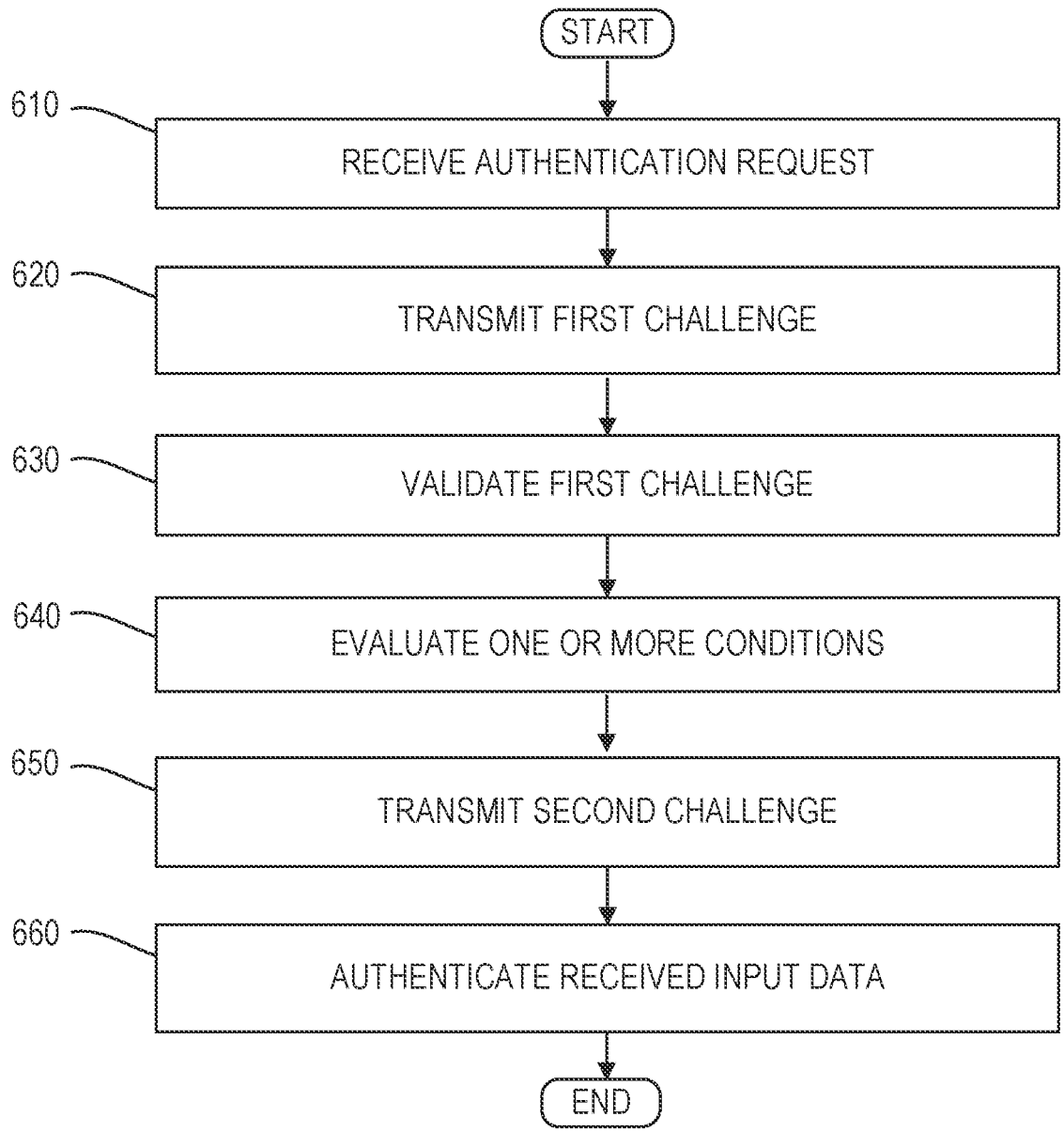
FIG. 6 depicts an authentication method according to an exemplary embodiment.

FIG. 6 depicts an authentication method 600 according to an exemplary embodiment. FIG. 6 may reference the same or similar components of system 100, first device 200 of FIG. 2A and FIG. 2B, method 300 of FIG. 3, sequence diagram 400 of FIG. 4, and method 500 of FIG. 5.

At block 610, the method 600 may include receiving, at a processor, an authentication request. For example, the processor may belong to a relying party or server. In some examples, the authentication request may comprise a request for Fast Identity Online 2 (FIDO2) website registration.

At block 620, the method 600 may include transmitting, by the processor, a first challenge. For example, the processor may be configured to transmit the first challenge to an authenticator, such as an application comprising instructions for execution on an intermediary second device or client device. In some examples, the processor may be configured to generate, responsive to the authentication request, one or more challenges. For example, the processor may be configured to generate a first challenge. In some examples, the relying party may be configured to challenge the authenticator, such as a processor of a mobile device, to login. The first challenge may include an identifier, such as a user identifier or a site identifier, that may be used to select an appropriate FIDO key pair. The first challenge may further include an unpredictable number, which may be given by the relying party, that is used to prevent replay. For example, for each instance of authentication, a new unpredictable number will be needed and thus the unpredictable number will be different each time. In this manner, this avoids utilizing a signature of the old unpredictable number and instead utilizes the number for the instant session of authentication.

At block 630, the method 600 may include validating the first challenge. For example, a first instruction may be transmitted to a first device by the authenticator. In some examples, the first instruction may be generated and/or transmitted by the authenticator to a processor of a card. The authenticator, such as the processor of the mobile device, may be configured to generate one or more instructions. For example, the processor of the mobile device may be configured to generate a first instruction. Each instruction may include one or more requests. The first instruction may include a first request to retrieve a first key from the processor of a first device, such as a card. The key may comprise a FIDO key. The FIDO private key may be retrieved via entry of a communication interface of the first device into a communication field, such as the communication field of the authenticator. In some examples, the first instruction may include a request to generate the FIDO private key by the processor of the first device. In other examples, the first instruction may include a request to regenerate the first FIDO key, such as the FIDO private key which is part of a public/private key pair, by the processor of the first device.

For example, the authenticator may be configured to prompt, based on the first challenge received from the relying party or processor of the server, one or more entries of a first device by generating one or more instructions. For example, the one or more entries may include at least one selected from the group of a tap, a swipe, a wave, or the like, and/or any combination thereof. The first instruction may include a request to generate the first FIDO key by the first device. In some examples, the first FIDO key may be generated based on a master key and an identifier associated with the first request using one or more cryptographic algorithms. For example, the identifier may include a site identifier and combined with the master key to produce a key pair. In some examples, the master key be stored on the first device, and the master key may be combined with the site identifier on the first device to generate the private key.

For example, thee processor of the first device may be configured to generate and transmit the first FIDO key. For example, a communication interface of the first device may enter a communication field of the authenticator, such as the communication field of the mobile device, to transfer the first FIDO key. The first device may be configured to, depending on the first instruction received from the authenticator, generate or retrieve a FIDO key pair associated with a specific user or site. The generated or retrieved FIDO key pair may be read by the authenticator. The FIDO key pair may include a FIDO private key which may be read by the authenticator from the first device and may be used by the authenticator to sign the first challenge resulting in a signed challenge data. The FIDO private key may be retrieved via entry of a communication interface of the first device into a communication field. In some examples, the FIDO private key may be encrypted by the first device prior to its transfer to the authenticator, in which case the processor of the mobile device may be configured to decrypt the received encrypted FIDO private key.

In some examples, the FIDO private key may be generated based on a master key and an identifier associated with the authentication request using one or more cryptographic algorithms. For example, the identifier may include a site identifier and combined with the master key to produce another key pair. The first device may be configured to store a finite number of keys in its memory so as to avoid having to regenerate keys. In other examples, the first instruction from the authenticator may include a request to regenerate the FIDO private key, such as a private key which is part of a public/private key pair, by the first device.

In some examples, the master key be stored in memory on the first device, and the master key may be combined with the site identifier on the first device to generate the FIDO private key. In other examples, the master key may be transferred from the first device to the authenticator, in which the combining of the master key and the site identifier is performed by the authenticator to generate the FIDO private key.

In some examples, transmission of the FIDO private key from the first device to the authenticator may be prevented. For example, over the air (OTA) transmission of the FIDO private key is avoided when the first device performs the signing of the first challenge. Thus, the first challenge and the site or user identifier information is transmitted to the first device from the authenticator, which thereby distributes its computation to the first device through near field communication (NFC) via a proxy protocol.

In some examples, rather than generating or storing the FIDO private key in the first device, the FIDO private key may be generated or stored in a secure element belonging to the authenticator. For example, the FIDO private key may be stored in a secure element maintained by a second device. In some examples, the secure element may comprise a tamper-resistant secure storage area in which one or more keys may be securely stored and retrieved by the relying party.

In some examples, the processor of the first device may be configured to generate the FIDO private key. The processor of the first device may be configured to transmit the FIDO private key. For example, the processor of the first device may be configured to transmit the FIDO private key to the authenticator, such as an application comprising instructions for execution on a second device. As previously explained above, the authenticator may be, without limitation, a mobile device such as a laptop or a tablet or a phone. In some examples, the FIDO private key may be transmitted and received via one or more channels. For example, the FIDO private key may be transmitted and received via an out-of-band channel. The processor of the first device may be configured to transmit the FIDO private key to the authenticator via entry of the communication interface of the first device into a communication field of the authenticator. In some examples, the entry may be associated with one or more gestures, including but not limited to one or more taps, swipes, waves, and/or any combination thereof.

In some examples, the authenticator may be configured to receive the first FIDO key. For example, the application of the second device may be configured to receive the first FIDO private key from the processor of the first device. The authenticator may be configured to sign the first challenge using the received first FIDO key. The authenticator may be configured to transmit the signed first challenge to the relying party for validation. The processor of the relying party or server may be configured to validate the signed first challenge. For example, the processor of the relying party or server may be configured to receive the signed first challenge from the authenticator. For example, the relying party may validate the signed challenge data with the FIDO public key that was stored when the user registered to the site. The validation may comprise the result of the authentication process, which includes signature verification. The authenticator may be configured to transmit the first FIDO key to the processor of the relying party for validation, and thus the authenticator may be configured to serve as an intermediary device between the first device and the processor of the relying party.

At block 640, the method 600 may include evaluating, by the processor, one or more conditions. For example, at least one of the one or more conditions may include determining a threshold number of authentication requests over a predetermined time period. For example, the processor may be configured to determine whether an abnormal number of transactions or requests were performed within any number of seconds, minutes, hours, days, weeks, months, years, etc. In another example, at least one of the one or more conditions may include determining whether misuse or fraud associated with an account and/or user occurred. For example, the processor may be configured to determine whether a user transaction history is indicative of excessive amount of purchases or abnormal locations. In this manner, conditional multifactor authentication may be implemented to improve security, which may trigger transmittal of the second challenge for receiving the input data.

At block 650, the method 600 may include transmitting, by the processor, a second challenge. For example, the processor of the relying party or server may be configured to generate a second challenge. For example, the second challenge may include a second request to transmit input data. In some examples, the processor of the relying party or server may be configured to evaluate one or more conditions, as previously explained. In some examples, the second challenge may be transmitted by the processor after evaluation of one or more conditions.

In some examples, the authenticator may be configured to receive the second challenge. For example, the processor of the mobile device may be configured to receive, after evaluation of the one or more conditions by the relying party or server, the second challenge from the processor of the relying party or server. In some examples, the second challenge may be forwarded by the processor of the relying party or server to the authenticator, such as the application comprising instructions for execution of the mobile device via one or more push notifications.

The authenticator may be configured to transmit, based on the second challenge, the input data. For example, the processor or application of the mobile device may be configured to transmit the input data to the relying party, such as the processor of the server. The input data may include at least one selected from the group of biometric data and credential data. For example, the input data may include biometric data, credential data, and/or any combination thereof. Without limitation, the biometric data may include at least one selected from the group of a fingerprint, a facial scan, a retinal scan, a voice recognition, and/or any combination thereof. In some examples, the input data may additionally and/or alternatively include credential data. Without limitation, the login data may include at least one selected from the group of an entry of a user name, a password, an account number, a security code, a one-time passcode, an answer to a security question, and/or any combination thereof.

At block 660, the method 600 may include authenticating, by the processor, received input data. For example, the processor of the relying party or server may be configured to complete the authentication request by authenticating the input data. For example, the processor of the relying party or server may be configured to receive the input data from the authenticator, such as the processor or application comprising instructions for execution of the mobile device. In some examples, the processor of the relying party or server may be configured to generate one or more outcomes by comparing the received input data with reference input data. In some examples, the reference input data may be stored by the relying party or server. In other examples, the reference input data may be requested by the relying party or server.

For example, the processor of the relying party or server may be configured to receive, via one or more requests, reference input data, or alternatively transmit the input data for comparison with the reference input data to a database. For example, the relying party or server may be configured to generate an outcome indicative of successful authentication when it results in a successful match based on the comparison between the received input data with reference input data. In another example, the relying party or server may be configured to generate an outcome of unsuccessful authentication when it results in an unsuccessful match based on the comparison between the received input data with reference input data. Upon determination of an unsuccessful authentication, the relying party or server may be configured to re-authenticate the input data up to and including a predetermined number of attempts before successfully authenticating the input data so as to complete the authentication request, or aborting the completion of the authentication request. In this manner, sequence diagram 400 of authentication process may implement with distributed storage, cloud-based storage, and other forms of storage in support of the aforementioned functionalities.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An authentication system for enabling a Fast Identification Online (FIDO) authentication into a browser application of a computing device, the authentication system comprising:
   a contactless card having a near-field communication (NFC) interface; and
   an authenticator device, the authenticator device having an NFC connectivity to the contactless card and a first application for communicating with a relying server, wherein the authenticator device:
      receives, a FIDO challenge generated by the relying server, the FIDO challenge being transmitted by the relying server in response to a FIDO authentication request initiated from the browser application of the computing device,
      transmits a first instruction, via the NFC connectivity, to the contactless card, the first instruction including a request to retrieve a first FIDO key from the contactless card,
      signs the FIDO challenge, received from the relying server, using the first FIDO key retrieved from the contactless card, and
      transmits, via the first application, the signed FIDO challenge to the relying server for validation using a second FIDO key,
   wherein the first FIDO key is generated based on a master key and an identifier associated with the FIDO authentication request using one or more cryptographic algorithms.

2. The authentication system of claim 1, wherein the first instruction includes a request to generate the first FIDO key.

3. The authentication system of claim 1, wherein the second FIDO key corresponds to a public key of the first FIDO key.

4. The authentication system of claim 1, wherein the first instruction includes a request to regenerate the first FIDO key.

5. The authentication system of claim 1, wherein the FIDO challenge is received in response to an authentication request for a FIDO website registration.

6. The authentication system of claim 1, wherein the authenticator device receives input data including at least one selected from the group of biometric data and credential data.

7. The authentication system of claim 1, wherein the first FIDO key is retrieved via entry of the NFC interface into a communication field of the authenticator device.

8. The authentication system of claim 6, wherein the input data is transmitted after determination of one or more conditions.

9. A method of contactless Fast Identity Online authentication into a browser application of a computing device, the method comprising the steps of:
   receiving, by a first application executing on an authenticator device, a FIDO challenge generated by a relying server in response to a FIDO authentication request initiated from the computing device,
   transmitting, by the authenticator device, a first instruction, to a contactless card, the first instruction including a request to retrieve a first FIDO key from the contactless card;
   signing, by the first application of the authenticator device, the FIDO challenge received from the relying server, using the first FIDO key retrieved from the contactless card; and transmitting, via the first application, the signed FIDO challenge to the relying server for validation using a second FIDO key, wherein the first FIDO key is generated based on a master key and an identifier associated with the FIDO authentication request using one or more cryptographic algorithms.

10. The method of claim 9, wherein the first instruction includes a request to generate the first FIDO key.

11. The method of claim 9, wherein the second FIDO key corresponds to a public key of the first FIDO key.

12. The method of claim 9, wherein the first instruction includes a request to regenerate the first FIDO key.

13. The method of claim 9, wherein the FIDO challenge is received in response to an authentication request for FIDO website registration.

14. The method of claim 9, further comprising receiving, by the authenticator device, input data including at least one selected from the group of biometric data and credential data.

15. The method of claim 9, wherein the first FIDO key is retrieved by the authenticator device via entry of a communication interface, associated with the contactless card, into a communication field associated with the authenticator device.

16. The method of claim 14, wherein the input data is transmitted after determination of one or more conditions.

17. The method of claim 16, wherein at least one condition comprises determining a threshold number of authentication requests over a predetermined time period.

18. A computer readable non-transitory medium comprising computer executable instructions that, when executed on a processor of an authenticator device, cause the processor to perform procedures comprising the steps of:

receiving, by a first application executing on an authenticator device, a Fast Identity Online (FIDO) challenge generated by a relying server in response to a FIDO authentication request initiated from a computing device;

transmitting, by the authenticator device, a first instruction, to a contactless card, the instruction including a request to retrieve a first Fast Identity Online (FIDO) key from the contactless card;

signing, by the first application of the authenticator device, the FIDO challenge received from the relying server, using the first FIDO key retrieved from the contactless card; and transmitting, via the first application, the signed FIDO challenge to the relying server for validation using a second FIDO key, wherein the first FIDO key is generated based on a master key and an identifier associated with the FIDO authentication request using one or more cryptographic algorithms.

\* \* \* \* \*